(12) United States Patent
Jen et al.

(10) Patent No.: US 8,480,776 B2
(45) Date of Patent: Jul. 9, 2013

(54) AIR FILTRATION DEVICE FOR COMPRESSOR

(75) Inventors: Shang-Shung Jen, Taipei (TW); Shih-Ping Liu, Taipei (TW)

(73) Assignee: Fu Sheng Industrial Co., Ltd., Taipei (TW)

( * ) Notice: Subject to any disclaimer, the term of this patent is extended or adjusted under 35 U.S.C. 154(b) by 89 days.

(21) Appl. No.: 13/334,658

(22) Filed: Dec. 22, 2011

(65) Prior Publication Data

US 2012/0186208 A1 Jul. 26, 2012

(30) Foreign Application Priority Data

Jan. 24, 2011 (TW) .............................. 100201503 U

(51) Int. Cl.
*B01D 46/00* (2006.01)
(52) U.S. Cl.
USPC .................. 55/417; 55/420; 55/498; 55/502
(58) Field of Classification Search
None
See application file for complete search history.

(56) References Cited

U.S. PATENT DOCUMENTS

| 4,045,349 A * | 8/1977 | Humbert, Jr. ................. 210/232 |
| 5,762,671 A * | 6/1998 | Farrow et al. .................... 55/496 |
| 7,101,412 B2 * | 9/2006 | Gossweiler ..................... 55/502 |

* cited by examiner

*Primary Examiner* — Duane Smith
*Assistant Examiner* — Phillip Shao
(74) *Attorney, Agent, or Firm* — Chun-Ming Shih; HDLS IPR Services

(57) ABSTRACT

An air filtration device for a compressor is disclosed. A sealing head is fixed onto an opening of the compressor and has a first-end opening, a second-end opening and a screw hole; the first-end opening has a first thread; a sealing cap is coupled to the second-end opening and includes a cover plate, a screw and a first positioning portion; the screw is screwed into the screw hole; an air filter is coupled to the first-end opening and includes a filter core and a filter cover; the filter cover has a second thread and a second positioning portion, and the second threads are engaged with the first threads, and the second positioning portion is positioned on the first positioning portion. When the air filter is rotated, the cover plate is moved with the filter cover to seal or leave the second-end opening.

10 Claims, 8 Drawing Sheets

AIR FILTRATION DEVICE FOR COMPRESSOR

FIELD OF THE INVENTION

The present invention relates to an air filtration device, in particular to an air filtration device for a compressor.

BACKGROUND OF THE INVENTION

At present, most production lines of a factory adopt an automation system and use pneumatic components, pneumatic tools or machines to achieve a fast production with a minimum labor force, and the use of the aforementioned equipments requires high-pressure gas. Therefore, an air compressor provided for producing a high-pressure gas has become one of the necessary equipments in factories nowadays.

In general, the operation method of an air compressor is to pump outside air into the compressor and compress the air, and then discharge the compressed air with a specific pressure. In addition, various different kinds of air compressors are available in the market, and users select one of the models according to the required quantity and quality of the air used. In addition, the air compressor requires an air filter for filtering the air that enters into the air compressor.

Traditionally, an air filter is changed or cleaned periodically to maintain the quality of the gas and extend the service life of the air compressor, and it is generally necessary to stop the operation of the air compressor in order to replace the air filter, and then turn on the air compressor again after the replacement is finished. Obviously, such arrangement affects the production flow, the schedule, and the normal operation of the factory and causes tremendous inconvenience.

In view of the foregoing problem, the inventor of the present invention conducted extensive researches and experiments, and finally provided a feasible design to overcome the aforementioned problem.

SUMMARY OF THE INVENTION

Therefore, it is a primary objective of the present invention to provide an air filtration device for a compressor to achieve the effect of changing the air filter without the need of stopping the operation of the air compressor.

To achieve the aforementioned objective, the present invention provides an air filtration device for a compressor, and the compressor has an opening, and the air filtration device comprises a sealing head, a sealing cap, and an air filter, wherein the sealing head is a hollow cylinder fixed to the opening and has a first-end opening, a second-end opening corresponding to the first-end opening, and a screw hole, and the first-end opening has a plurality of first threads, and the sealing cap is coupled to a side of the second-end opening and includes a cover plate, a screw coupled to the cover plate and a first positioning portion disposed on the screw and screwed into the screw hole, and the air filter is coupled to a side of the first-end opening of the sealing head and includes a filter core and a filter cover installed at an end of the filter core, and the filter cover has a plurality of second threads and a second positioning portion, and the second threads are engaged with the corresponding first threads, and the second positioning portion is positioned on the first positioning portion. When the air filter is rotated, the cover plate will be moved with the filter cover to seal or leave the second-end opening.

Compared with the prior art, the filtration device for a compressor of the present invention fixes the sealing head having the first thread to the opening of the compressor and mounts the air filter having the second thread onto the sealing head, and positions the sealing cap at the air filter, so that when the air filter is rotated, the cover plate will be moved with the rotating air filter to seal the sealing head and maintain the air-tightness of the compressor to prevent an air leakage. The invention provides a practical and convenient application for changing the air filter without the need of stopping the operation of the compressor.

DESCRIPTION OF THE PREFERRED EMBODIMENTS

The technical characteristics and contents of the present invention will become apparent with the following detailed description and related drawings. The drawings are provided for the purpose of illustrating the present invention only, but not intended for limiting the scope of the invention.

Figure 1:
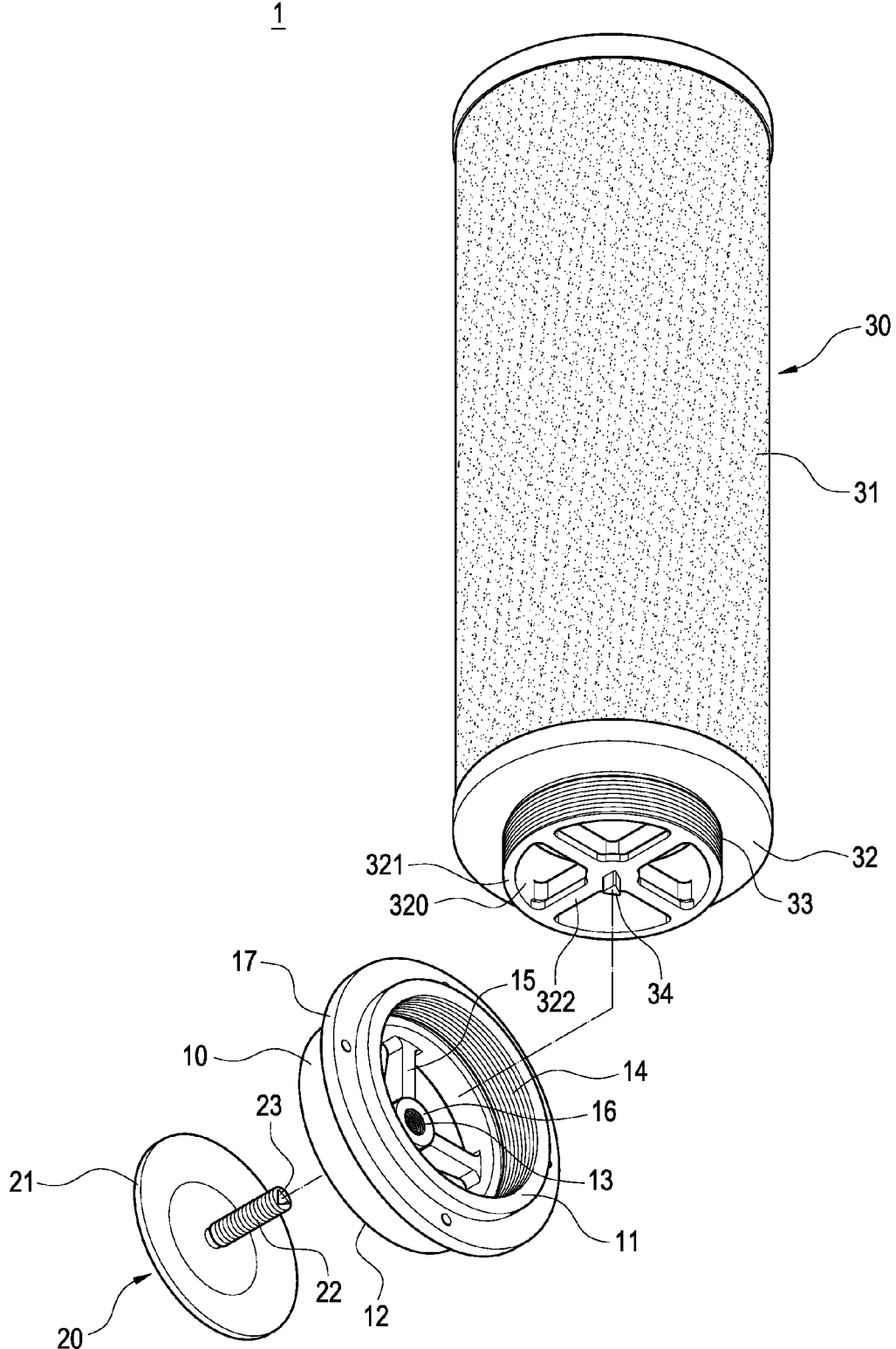
FIG. 1 is an exploded view of an air filtration device for a compressor in accordance with the present invention.
Figure 2:
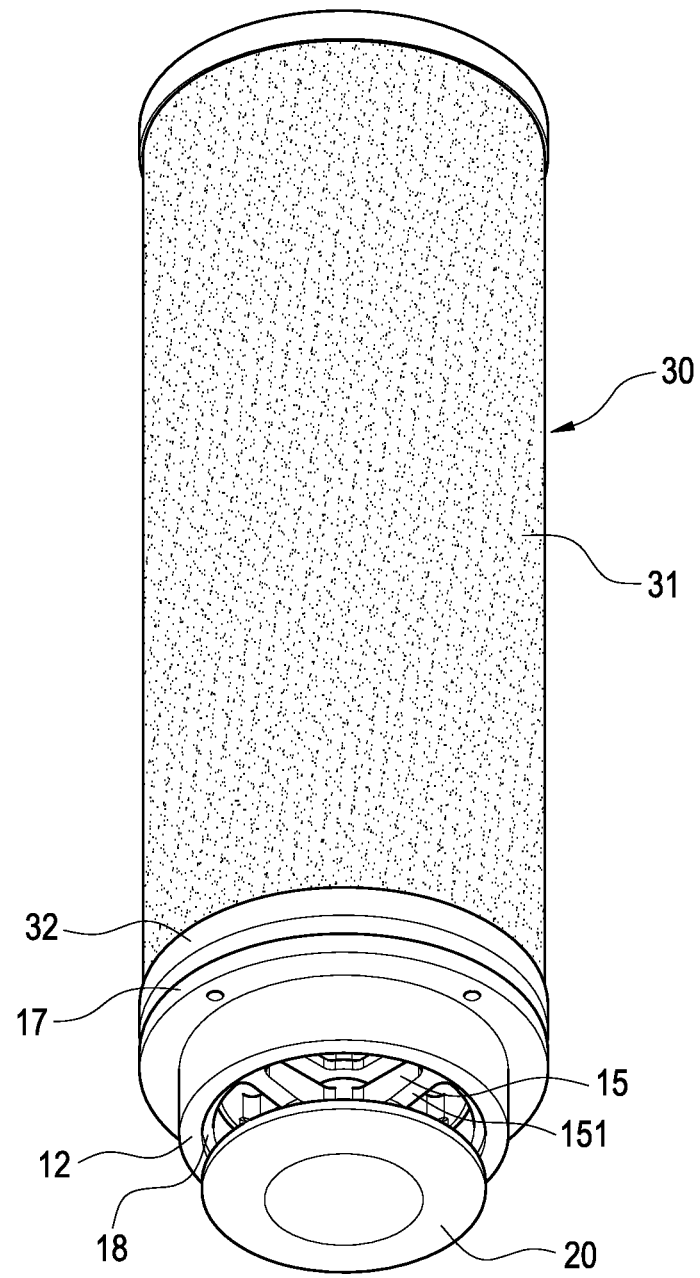
FIG. 2 is a perspective view of an air filtration device for a compressor in accordance with the present invention.
Figure 3:
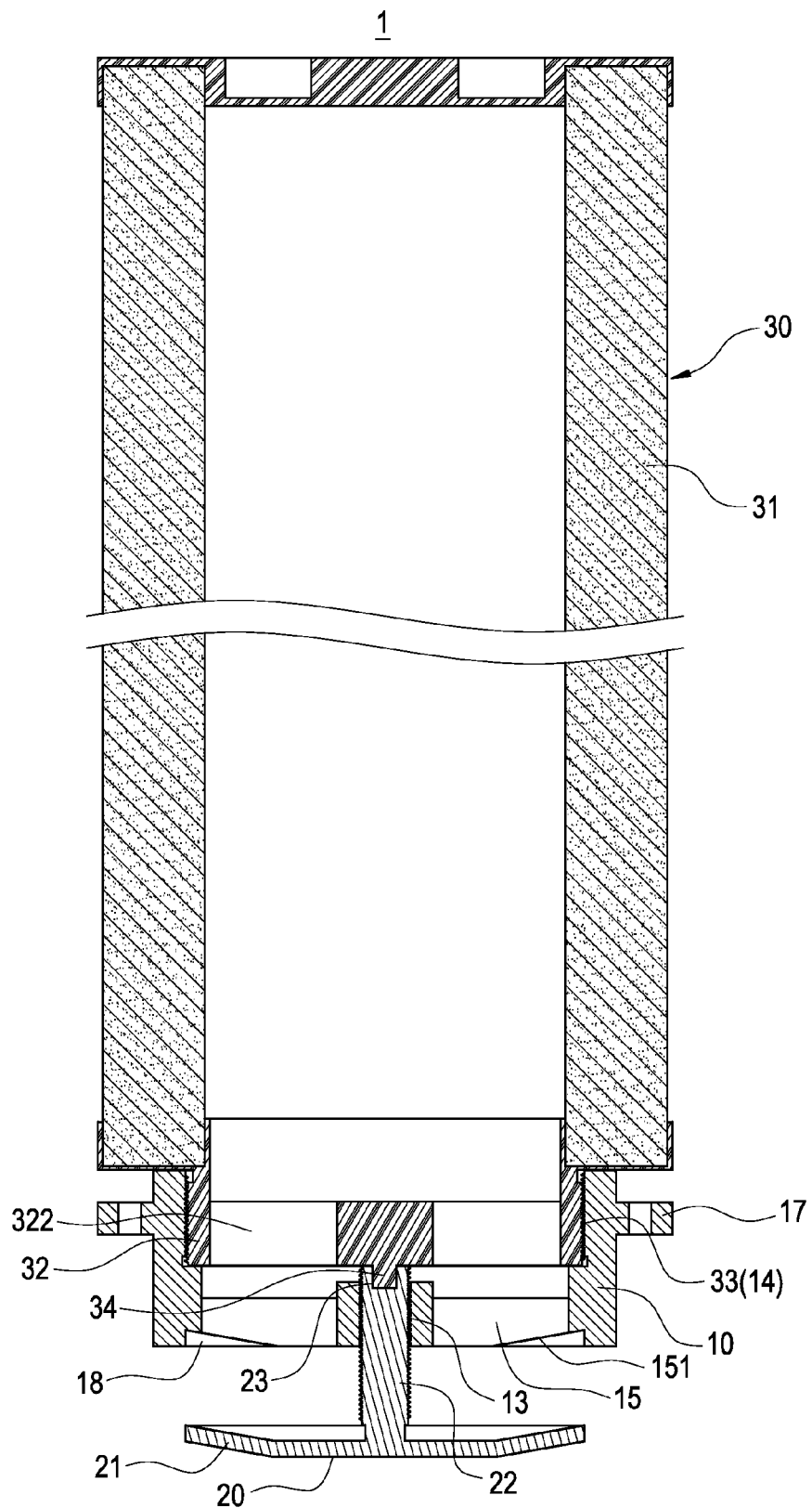
FIG. 3 is a cross-sectional view of an air filtration device for a compressor in accordance with the present invention.

With reference to FIGS. 1 to 3 for an exploded view, a perspective view and a cross-sectional view of an air filtration device for a compressor in accordance with the present invention respectively, the air filtration device 1 comprises a sealing head 10, a sealing cap 20, and an air filter 30.

The sealing head 10 is a hollow cylinder having a first-end opening 11 and a second-end opening 12 disposed at a position opposite to the first-end opening 11, and a screw hole 13, and the first-end opening 11 has a plurality of first threads 14, and the sealing head 10 has a plurality of combining ribs 15 formed between the first-end opening 11 and the second-end opening 12, and a stud 16 disposed at an intersection of the combining ribs 15 and having the screw hole 13 formed on the stud 16. In this preferred embodiment, the combining ribs 15 are arranged in a cross-shape, and the sealing head 10 has a flange 17 formed on an external surrounding surface of the sealing head 10, and an embedded slot 18 formed at the second-end opening 12, and the combining ribs 15 are extended from the embedded slot 18 towards the interior of the sealing head 10, and an embedding surface 151 is coupled to the embedded slot 18.

The sealing cap 20 is coupled to a side of the second-end opening 12 and includes a cover plate 21, a screw 22 coupled to the cover plate 21 and a first positioning portion 23 disposed at the screw 22, and the screw 22 is screwed into the screw hole 13 of the sealing head 10, and the cover plate 21 is coupled to the corresponding second-end opening 12.

The air filter 30 is coupled to a side of the first-end opening 11 of the sealing head 10 and includes a filter core 31 and a filter cover 32 installed at an end of the filter core 31, and the filter cover 32 has a plurality of second threads 33 and a second positioning portion 34, and the second threads 33 are engaged with the corresponding first threads 14, and the second positioning portion 34 is disposed at a corresponding position of the first positioning portion 23.

In this preferred embodiment, the filter cover 32 includes a protruding column 321, a plurality of through holes 320 formed on the protruding column 321, and a plurality of positioning ribs 322, wherein the second positioning portion 34 is disposed at an intersection of the positioning ribs 322, and the second threads 33 are formed on an external surrounding surface of the protruding column 321. In addition, the first positioning portion 23 is a triangular hole, and the second positioning portion 34 is a corresponding triangular column (but the invention is not limited to such arrangements only), and the second positioning portion 34 is passed through the screw hole 13 and disposed on the first positioning portion 23.

Figure 4:
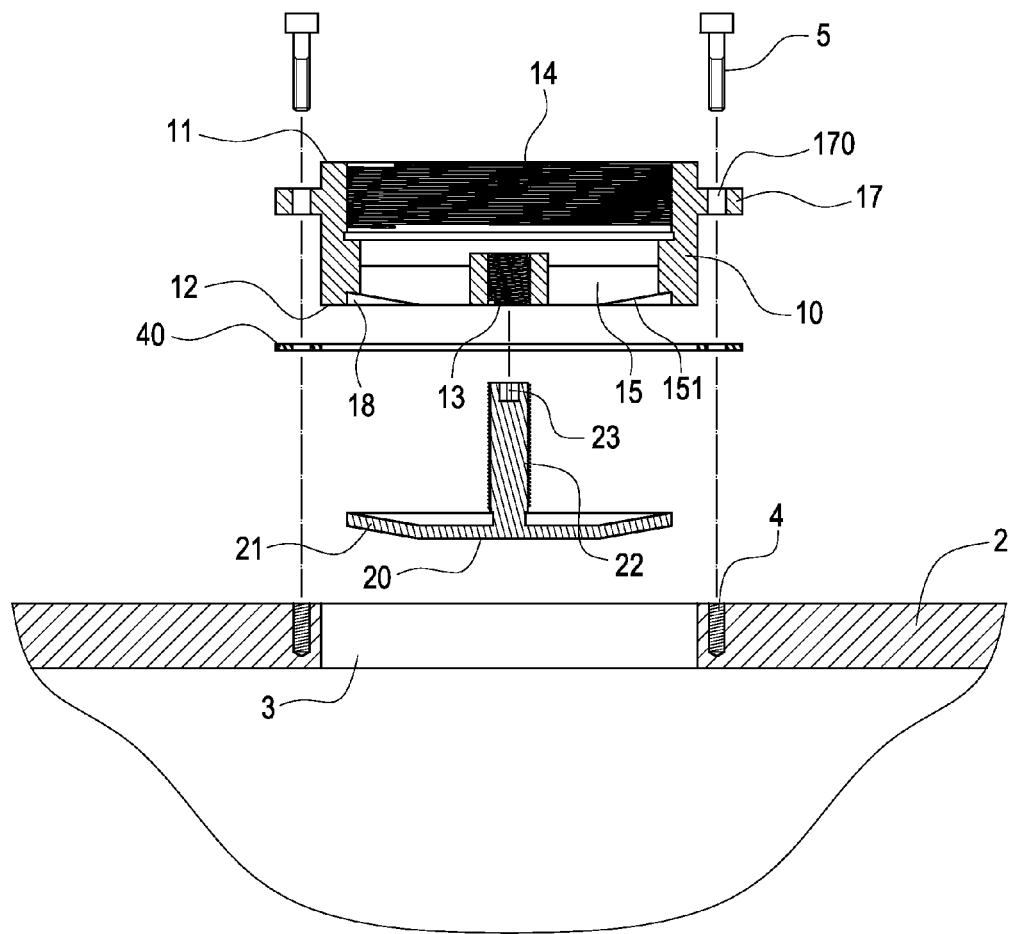
FIG. 4 is a first schematic view of assembling an air filtration device for a compressor in accordance with the present invention.
Figure 5:
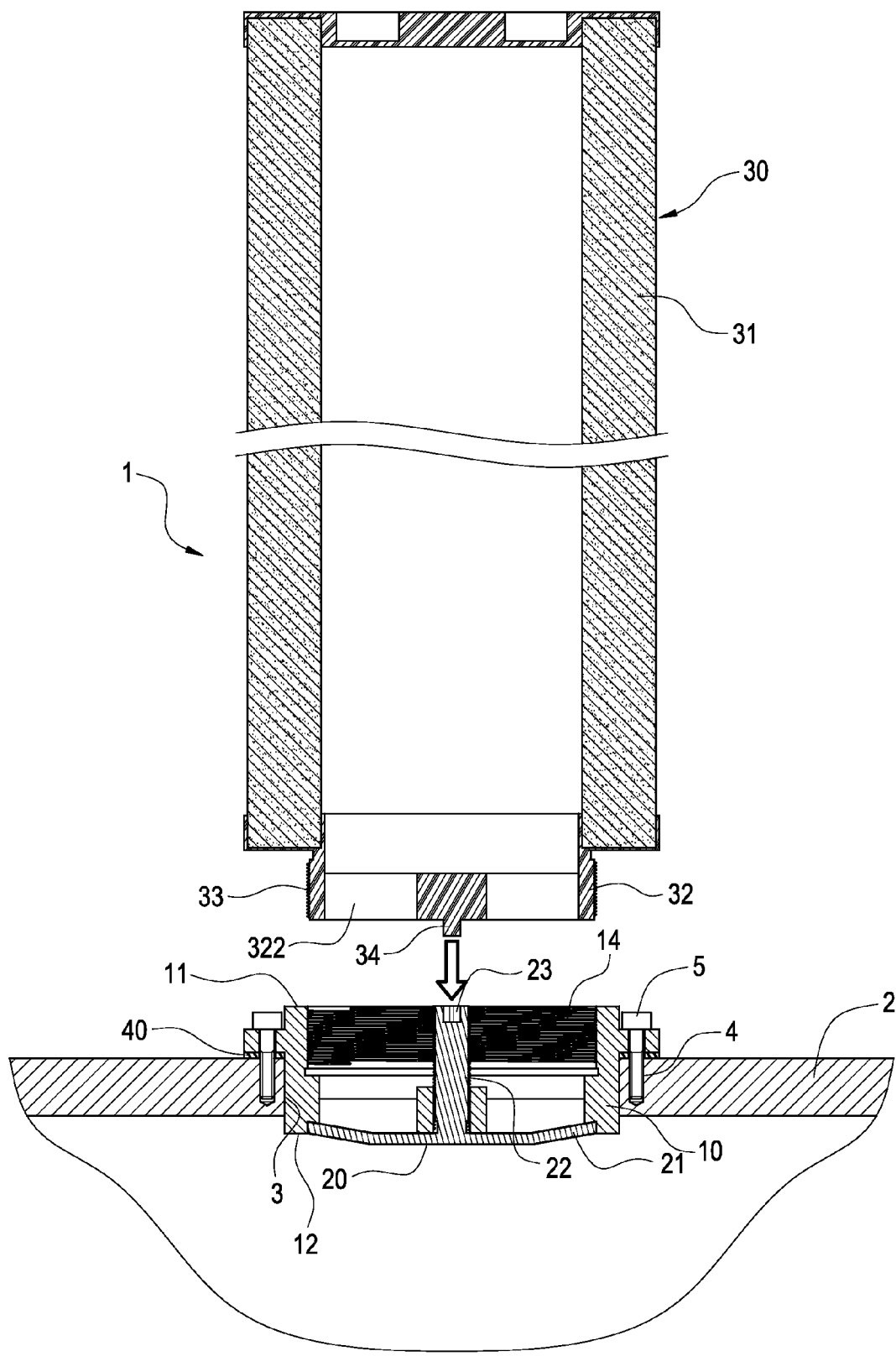
FIG. 5 is a second schematic view of assembling an air filtration device for a compressor in accordance with the present invention.

With reference to FIGS. 4 and 5 for two schematic views of assembling an air filtration device for a compressor in accordance with the present invention respectively, the air filtration device 1 is installed to a compressor 2, and the compressor 2 has an opening 3 for installing the air filtration device 1, and a plurality of fixing holes 4 formed at positions adjacent to a side of the opening 3.

Firstly, the screw 22 of the sealing cap 20 is screwed into the screw hole 13 of the sealing head 10. During the assembling, a gasket 40 can be installed between the sealing head 10 and the sealing cap 20 to enhance the air-tightness between the sealing head 10 and the sealing cap 20, and then the flange 17 is abutted against a side of the opening 3, and a plurality of locking members 5 is passed through a perforation 170 of the flange 17 and the fixing hole 4 to fix the sealing head 10 onto the opening 3.

Finally, the air filter 30 is installed, and the filter cover 32 is aligned precisely with the first-end opening 11 of the sealing head 10, and the second threads 33 are coupled to the corresponding first threads 14. In the meantime, the second positioning portion 34 of the filter cover 32 will be positioned on the first positioning portion 23 of the sealing cap 20. Therefore, the air filter 30 can be installed onto the compressor 2.

Figure 6:
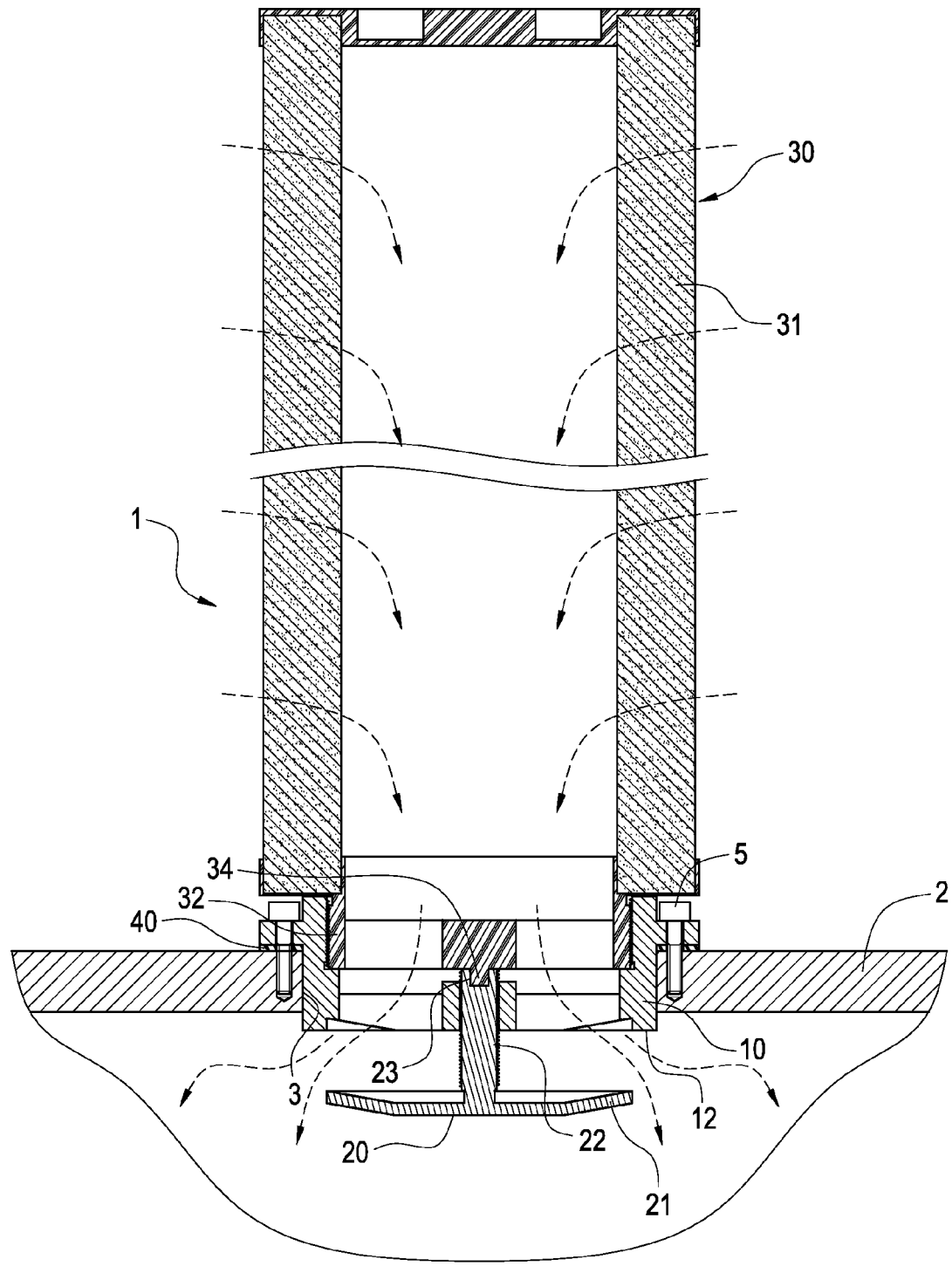
FIG. 6 is a schematic view of using an air filtration device for a compressor in accordance with the present invention.

With reference to FIG. 6 for a schematic view of using an air filtration device for a compressor in accordance with the present invention, the air filter 30 is installed to the compressor 2, and then the sealing cap 20 will be driven to leave the second-end opening 12 and maintain a gap from the sealing head 10. When the air filter 30 is used, outside air passes through the filter core 31 and then enters from the filter cover 32 (or the through hole 320) and the sealing head 10 into the compressor 2.

Figure 7:
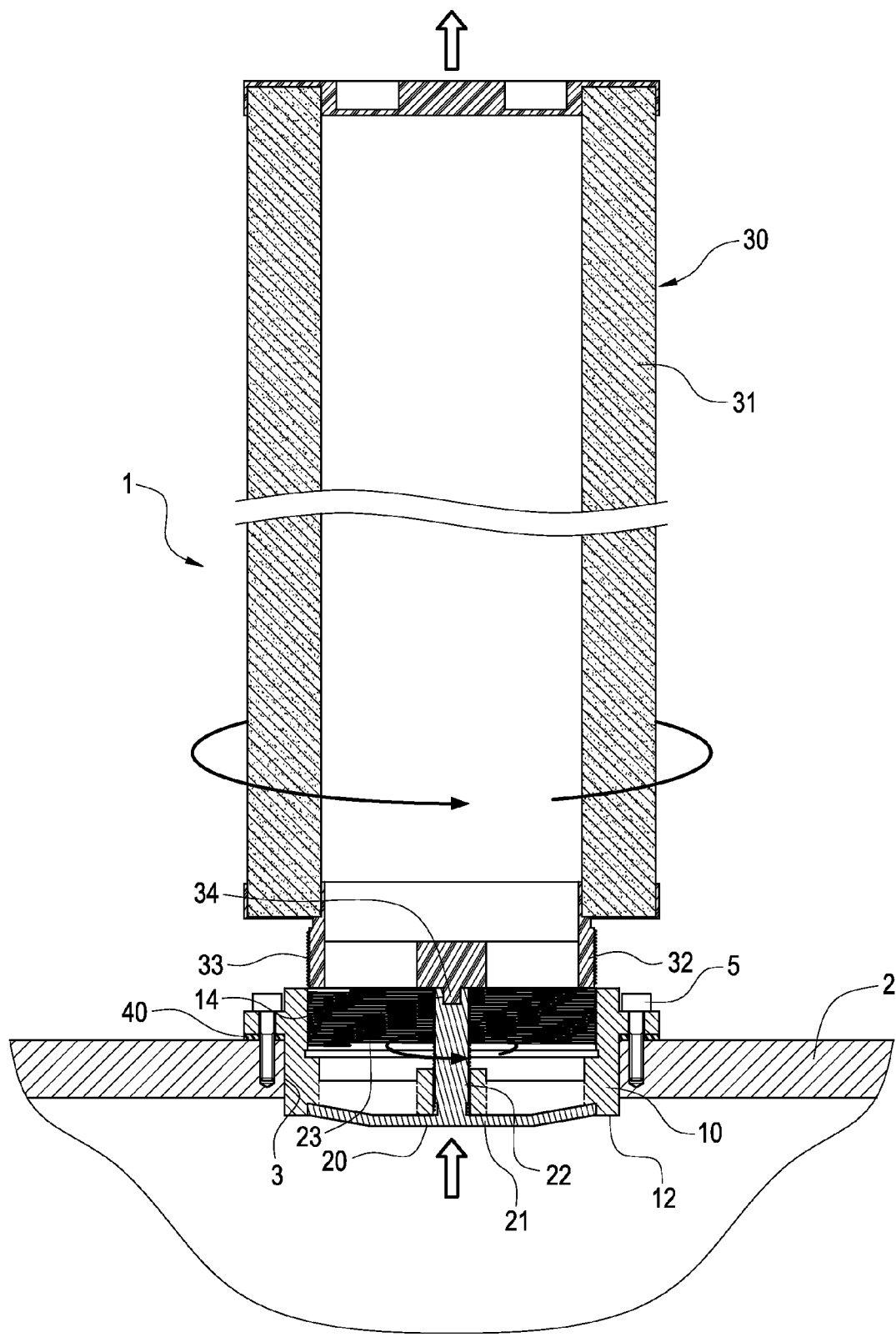
FIG. 7 is a schematic view of an air filtration device for a compressor in accordance with the present invention when it is disassembled.
Figure 8:
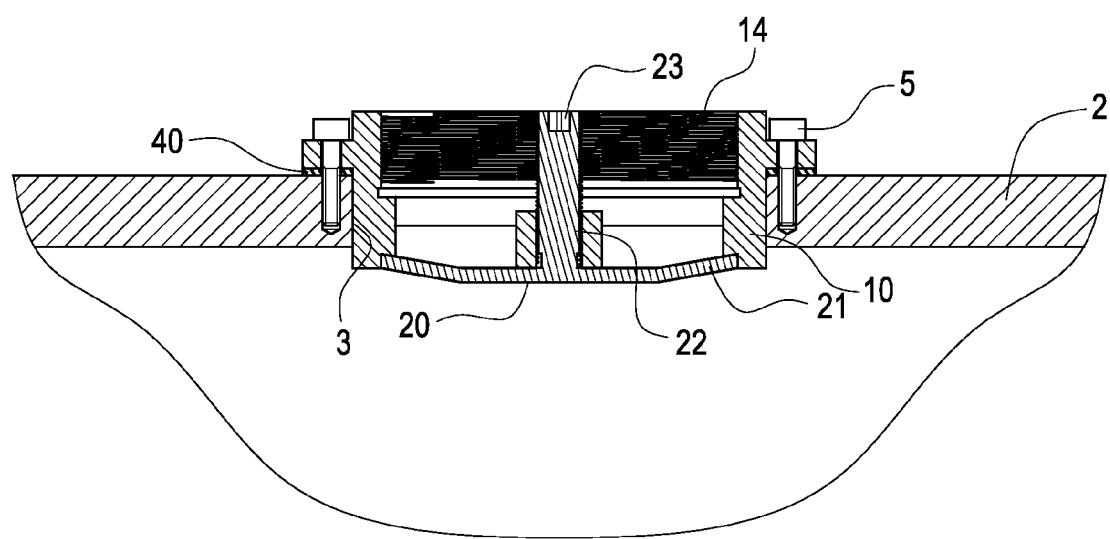
FIG. 8 is a schematic view of an air filtration device for a compressor in accordance with the present invention after it is disassembled.

With reference to FIGS. 7 and 8 for schematic views of an air filtration device for a compressor in accordance with the present invention when and after the air filtration device is disassembled respectively, the filter core 31 can be replaced without stopping the operation of the compressor 2.

If a user wants to change the filter core 31, the user turns the air filter 30, so that the second threads 33 are turned and separated from the first threads 14, and the cover plate 21 positioned on the filter cover 32 will be moved with the filter cover 32 in a direction towards the second-end opening 12. Until the air filter 30 is turned and separated from the sealing head 10, the second positioning portion 34 is separated from the first positioning portion 23, and an internal wall of the cover plate 21 is coupled to the embedded slot 18 of the sealing head 10, the combining rib 15 and the embedding surface 151 of the combining rib 15 (as shown in FIG. 3) to seal the second-end opening 12, so as to maintain the air-tightness of the compressor 2 to prevent an air leakage when the filter core 31 of the air filtration device 1 is changed, and also improve the convenience of use and changing the filter core 31 without the need of stopping the operation of the compressor 2.

While the invention has been described by means of specific embodiments, numerous modifications and variations could be made thereto by those skilled in the art without departing from the scope and spirit of the invention set forth in the claims.

What is claimed is:

1. An air filtration device for a compressor, and the compressor having an opening, and the air filtration device comprising:

a sealing head, being a hollow cylinder fixed to the opening, and having a first-end opening, a second-end opening formed at a position opposite to the first-end opening, and a screw hole, and the first-end opening having a plurality of first threads;

a sealing cap, coupled to a side of the second-end opening, and including a cover plate, a screw coupled to the cover plate and a first positioning portion disposed on the screw, and the screw being screwed into the screw hole; and an air filter, coupled to a side of the first-end opening of the sealing head, and including a filter core and a filter cover installed to an end of the filter core, and the filter cover having a plurality of second threads and a second positioning portion, and the second threads being combined with the corresponding first threads, and the second positioning portion being positioned on the first positioning portion;

wherein when the air filter is rotated, the cover plate is moved with the filter cover to seal or leave the second-end opening.

2. The air filtration device for a compressor as recited in claim 1, wherein the sealing head has a flange formed at an external surrounding surface of the sealing head and abutted against the opening of the compressor.

3. The air filtration device for a compressor as recited in claim 1, wherein the sealing head has a plurality of combining ribs formed between the first-end opening and the second-end opening, and a stud disposed at an intersection of the combining ribs, and the screw hole is formed on the stud.

4. The air filtration device for a compressor as recited in claim 3, wherein he combining ribs are arranged in a cross-shape.

5. The air filtration device for a compressor as recited in claim 3, wherein the sealing head has an embedded slot formed at a position of the second-end opening, and the combining ribs are extended from the embedded slot towards the interior of the sealing head, and an embedding surface formed at a position connecting to the embedded slot.

6. The air filtration device for a compressor as recited in claim 5, wherein the cover plate has an internal wall coupled to the embedded slot and the embedding surface for sealing the second-end opening.

7. The air filtration device for a compressor as recited in claim 1, wherein the first positioning portion is a triangular hole, and the second positioning portion is a triangular column corresponding to the triangle hole.

8. The air filtration device for a compressor as recited in claim 1, wherein the filter cover includes a protruding column, a plurality of through holes formed on the protruding column, and a plurality of positioning ribs, and the second threads are formed on an external surrounding surface of the protruding column.

9. The air filtration device for a compressor as recited in claim 8, wherein the second positioning portion is disposed at an intersection of the positioning ribs.

10. The air filtration device for a compressor as recited in claim 1, further comprising a gasket installed between the sealing head and the sealing cap.

\* \* \* \* \*